Dec. 1, 1942.  E. W. SCHELLENTRAGER  2,304,024
ADJUSTABLE TRIP FOR SCALES
Filed July 3, 1941  2 Sheets-Sheet 1

INVENTOR
EUGENE W. SCHELLENTRAGER
BY
Hyde and Meyer
ATTORNEYS

Dec. 1, 1942.  E. W. SCHELLENTRAGER  2,304,024
ADJUSTABLE TRIP FOR SCALES
Filed July 3, 1941  2 Sheets-Sheet 2
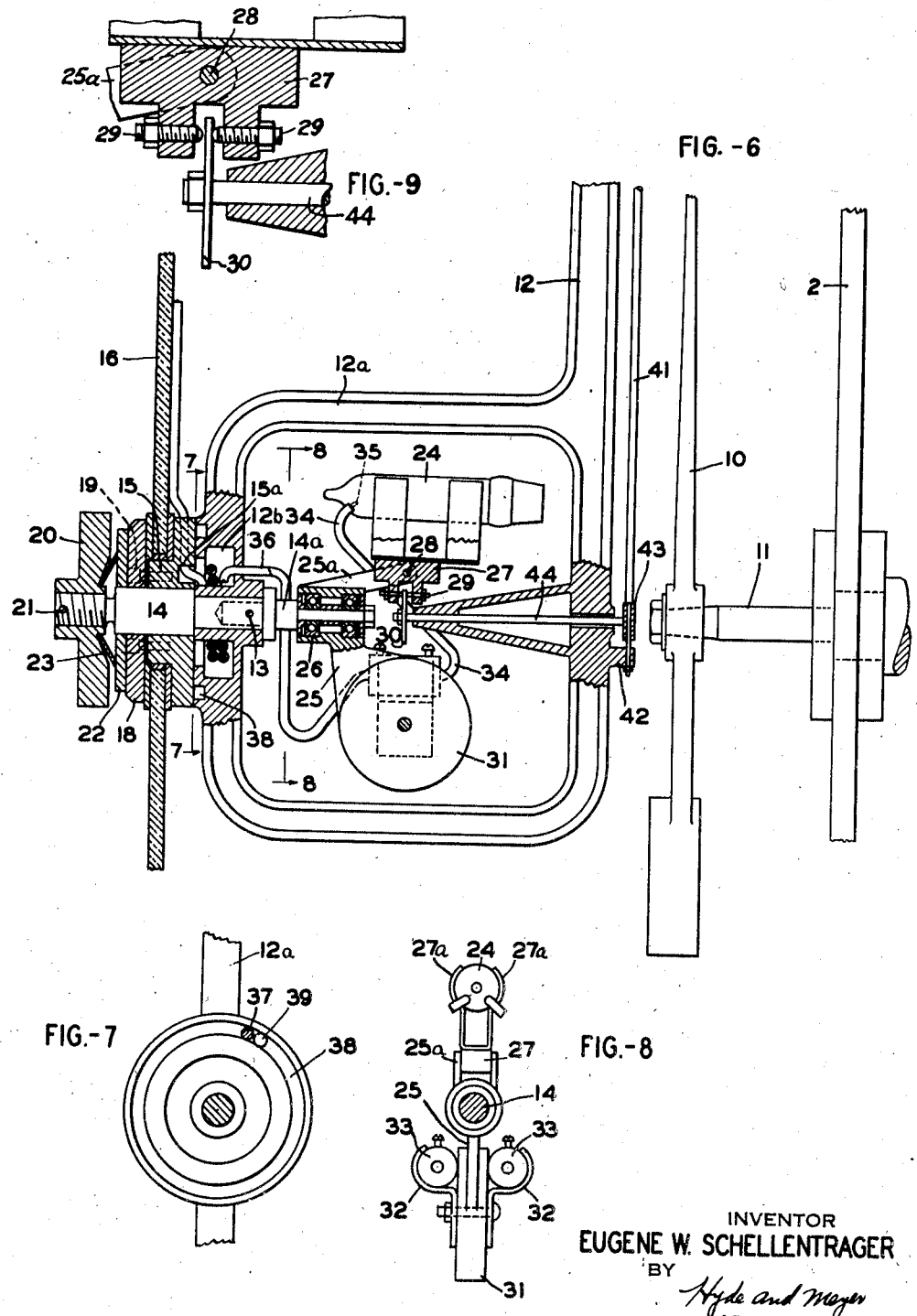
INVENTOR
EUGENE W. SCHELLENTRAGER
BY
Hyde and Meyer
ATTORNEYS Patented Dec. 1, 1942

2,304,024

UNITED STATES PATENT OFFICE 2,304,024

ADJUSTABLE TRIP FOR SCALES

Eugene W. Schellentrager, Shaker Heights, Ohio, assignor to The Atlas Bolt & Screw Company, Cleveland, Ohio, a corporation of Ohio Application July 3, 1941, Serial No. 400,901

6 Claims. (Cl. 200—56)

This invention relates to improvements in adjustable electric contacts in connection with the indicating dial of a weighing scale.

An object of the present invention is to provide novel switch mechanism operable by the dial scale pointer when the latter has reached any selected position on the dial.

Another object of the present invention is to provide an electric switch trip mechanism, which is operable from a point outside the scale housing without the use of any exceptional skill or intelligence, or without the use of special tools.

Another object of the present invention is the provision of novel tripping mechanism for a mercury switch, the latter being held in the same relative vertical position regardless of the adjustment of the trip mechanism.

Another object of the present invention is the provision of switch mechanism tripped by a scale pointer and arranged in such a manner as not to interfere with the accuracy of the weighing operation.

Other objects and advantages of the present invention will be apparent from the accompanying drawings and description and the essential features will be summarized in the claims.

Figure 1:
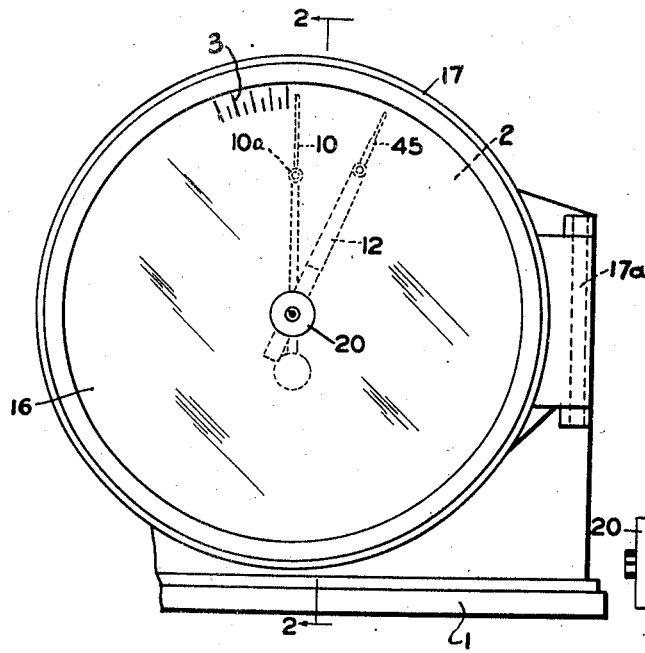
Figure 2:
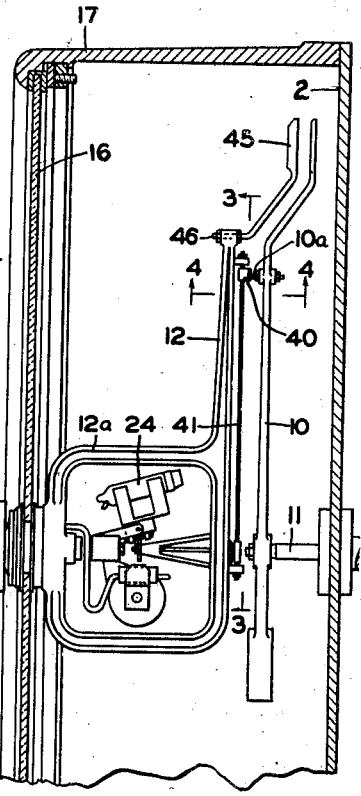
Figure 3:
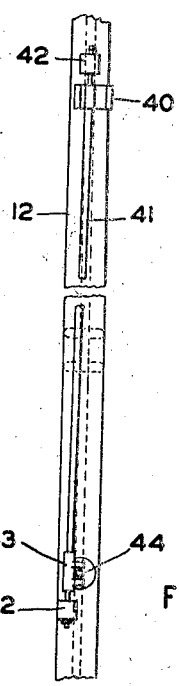
Figure 5:
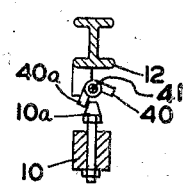
Figure 4:
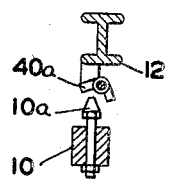

In the drawings, Fig. 1 is a front elevational view of a dial scale equipped with my invention; Fig. 2 is a fragmental sectional view taken along the line 2—2 of Fig. 1; Fig. 3 is an enlarged fragmental elevational view of a portion of the adjustable trip arm taken in substantially the position 3—3 of Fig. 2; Fig. 4 is an enlarged sectional view taken along the line 4—4 of Fig. 2; Fig. 5 is a view similar to Fig. 4 showing another position of the parts; Fig. 6 is an enlarged view of a portion of Fig. 2 with parts broken away in section to more clearly illustrate the construction; Figs. 7 and 8 are sectional views taken along similarly numbered lines of Fig. 6; and Fig. 9 is a detail view, on a larger scale, illustrating a portion of the switch operating mechanism.

My invention is here disclosed as applied to a weighing scale having a fixed or stationary frame or housing 1, on which is mounted a circular dial 2 weighing up to as much as 10,000 pounds or more and normally provided with twenty-five pound or other suitably valued graduations 3 around the outer periphery of the scale dial. A pointer 10 mounted on a shaft 11 moves over the graduations on the dial to indicate the amount weighed. It will be understood by those skilled in this art that the shaft 11 is connected with any known type of scale mechanism, part of which is enclosed in the body or housing 1, suitable and well known forms of which mechanism are shown in my prior Patent No. 1,755,078 granted April 15, 1930, or in Patent No. 1,329,567 granted February 3, 1920, to Samson D. Wright. Such weighing mechanisms are often utilized in connection with scale cars which are used for charging coke, ore and limestone into blast furnaces, although it will be understood that these scales have many other industrial applications. Such scale equipment utilizes electrical control for cutting off the flow from a storage hopper into the scale hopper when the desired amount has been received on a scale as indicated by the pointer 10. Also, interconnected electrical controls are used in these weighing operations to insure the proper sequence of scale charges. For these operations it is desirable to have an electric switch operated by the pointer 10 when it reaches a predetermined position on the scale dial. The herein described mechanism is useful for these purposes although it will be understood that I do not limit myself in the use of my improved mechanism.

As illustrated in my prior patent referred to, the dial 2 of the stationary housing or frame 1 is enclosed within a cover member 17 hinged or otherwise movably or removably connected, as at 17a, to the frame or housing 1. Within the hollow cover, and entirely supported thereby independently of direct connection to the stationary frame or housing 1, I mount an electric switch and operating mechanism therefor which includes a part adapted to be actuated by the movable scale pointer 10 or a part connected thereto, said mechanism being adjustable to various positions corresponding to various graduations of the scale dial, so that the switch may be actuated when a preselected or desired load has been placed upon the scale, and including a part which extends through any suitable portion of the cover 17, to the outside thereof, so as to be capable of adjustment or actuation by the operator without opening the scale cover. Any arrangement adjustable and operating in the manner described, is suitable for the purpose. As illustrated, an adjustable arm 12 is integral with an open central framework or bracket 12a which is pinned at 13 to a shaft 14 which in turn is rotatably mounted in a bearing 15 which is held by the glass or other form of transparent window 16 which is mounted upon the front face of the dial cover 17. The bearing 15 is clamped to the heavy plate glass 16 by means of the bearing plate 18 which is secured to the bearing 15 by a plurality of screws 19. A knurled operating knob 20 is secured to the outer end of shaft 14 by a cotter pin at the point 21. A wear washer 22 and a spring washer 23 lie between the knob 20 and the plate 18. The knob 20 is threaded onto shaft 14 until there is sufficient tension in the spring washer 23 to hold the knob 20, shaft 14 and arm 12 in any adjusted position by friction.

A mercury switch 24 is so mounted on the adjustable arm or bracket that the switch remains in the same position relative to the vertical regardless of the radial position of the adjustable arm 12 about the dial. In the form here shown, on an extension 14a of the shaft 14 is rotatably mounted a frame 25 preferably by means of a friction reducing bearing 26. On an upwardly extending branch 25a of the frame is pivotally mounted a switch cradle 27 which carries spring clips 27a embracing the switch 24. The cradle 27 is pivotally mounted on the arm 25a by means of a pivot pin 28 which is at right angles to shaft 14a. The cradle 27 carries two adjustable pins 29 which embrace without actually engaging a disk 30 for a purpose later described. A downwardly extending branch of the frame 25 carries a counterweight 31 which holds the frame 25 always in the same position relative to the vertical regardless of the position to which shaft 14 has been adjusted. Clips 32 on each side of the counterweight carry cable connectors 33 which serve to connect two wires 34 leading to two contacts 35 inside the mercury switch with corresponding lead-in wires 36 which preferably come from outside the housing 17 down along the inner face of glass window 16 through an opening 15a in the bearing 15 and thence are looped around shaft 14 in the hollow portion 12b of the bracket 12a and then lead to the cable connectors 33. This permits substantially 360° rotation of arm 12 without tangling of the wires 36. At the same time the cable connectors 33 permit the replacement of the mercury switch if necessary.

To prevent more than 360° rotation of knob 20 and shaft 14, which would tangle or break the wires 36, a pin 37 rigidly secured to bearing 15, as best seen in Fig. 7, rides in an annular groove 38 in bracket 12a, as best seen in Figs. 6 and 7. A pin 39 fixed in groove 38 is stopped by engagement with pin 37, thus permitting adjustment of bracket 12a and arm 12 around any portion of the dial scale except that portion subtended by the pin 37. This is placed at the low end of the dial scale near zero, which is a point never used in practical operation of a device of this kind.

The mechanism for operating the switch 24 comprises a pin 10a on the pointer 10 which engages a Y-crank 40 carried by the adjustable arm 12. This Y-crank is rigidly fastened to a shaft 41 which has bearings on the arm 12 at the points 42. Near the axis of rotation of the arm 12 the shaft 41 has a crank connection 43 with a plunger 44 which is located coaxial with shaft 14 and therefore also coaxial with shaft 11. On the inner end of plunger 44 is secured the disk 30 which lies between the adjustable pins 29 of the mercury switch cradle 27. When the Y-crank is in one of its positions the switch is in the position of Fig. 6 with the mercury pool at the right-hand end thereof and therefore the contacts 35 are open. In the other position of the Y-crank, the disk 30 has moved to the position of Fig. 2 and the switch 24 therefore has been tilted in a counterclockwise direction so that the mercury pool then makes connection between the contacts 35. It will be noted that the weight of the mercury pool in the switch 24 will hold the switch stable either in the position of Fig. 2 or of Fig. 6 once the switch has been moved to that position, but the switch is unstable in any intermediate position. It is obvious therefore that when the switch has been tilted to start the mercury pool past its center of gravity balance then the further movement of the mercury switch to its final tilted position is aided by the flow of the mercury toward the low end of the switch bulb. I make use of this feature to free the pointer 10 of any load immediately after it trips the switch and just before it completes its weight indicating movement. This is illustrated in Figs. 4 and 5. In Fig. 4 I have shown the projection 10a on the pointer just as it engages one arm of the Y-crank 40 to start the tilting of the mercury switch. In Fig. 5 I have illustrated how the flow of the mercury in the switch bulb has carried the arm 40a of the Y-crank 40 ahead of the projection 10a on the pointer so as to move that arm of the Y-crank out of the path of movement of the pointer permitting the latter to complete its weight indicating movement free of any load whatsoever. Normally the final weight is registered on a recorder and thus the exact weight will be recorded without interference by my improved switch tripping mechanism.

It is obvious that by reversing the position of the switch bulb 24 in the cradle 27, the switch contacts may be either opened or closed when the pointer 10 engages the Y-crank on the adjustable arm as desired in the specific installation.

Note that the disk 30 is circular in form and therefore engages the adjustable pins 29 on the mercury switch cradle whatever the position of the adjustable arm 12 about its approximately 360° of movement.

When the mercury switch has been tilted to the position of Fig. 2 by the engagement of pointer 10 with the Y-crank 40 so as to move the parts from the position of Fig. 4 to Fig. 5, the switch remains in that position until the load has been dumped from the weighing hopper. When the load has been emptied the pointer 10 returns to zero and in so doing moves the Y-crank back to and beyond the position of Fig. 4 so that all of the parts remain in position to repeat the operation unless the knob 20 is adjusted to trip the switch at some different weight.

An extension 45 is pivotally connected at 46 on the outer end of arm 12 so that the position of this arm may be read directly on the dial scale. The provision of the adjustable pivot 46 permits the setting of the pointer 45 slightly in advance of the true radial position of the arm 12 if desirable or necessary. Such a condition arises where it is desired to use the switch 24 to cut off the flow of material from the storage hopper into the weighing hopper slightly ahead of the receipt of the predetermined desired amount in the weighing hopper. In many installations a small amount of material will continue to dribble out of the storage hopper as the flow is cut off and by thus setting the pointer 45 slightly ahead of the radial position of arm 12 the operator is led to set the device automatically to take care of such dribble. In other words the pointer 45 may be set at 8,000 pounds but actually the switch 24 will be tripped slightly before the pointer 10 reaches 8,000 pounds so that the ultimate weight received in the scale car will actually be the 8,000 pounds desired.

Since the type of scale mechanism illustrated in the aforementioned Schellentrager and Wright patents has a high load capacity inherent in its design and thus requires a very much lower multiple of the scale levers (of the order of 25) than many other scales, there is much less possibility of introducing a weighing error by the frictional contact of the pointer 10 necessary to trip the switch.

It will thus be seen that I have provided a switch tripping device which can be instantly set at any point on the dial and it will then accurately operate the controls at the preset point. It is not necessary to have a mechanic or a high order of intelligence to set the tripping device and it can be done instantly and as many times as is necessary without opening the casing of the instrument and without causing any inconvenience. It will be understood that it is desirable to keep the cover or housing 17 closed at all times to prevent the entrance of dust into the delicate weighing mechanism. At the same time, as before described, said cover or housing serves as the support for the shaft 14, 14a, and the bracket 12a and the parts carried thereby, including the electric switch parts, so that when the cover is taken off, or is swung out to open position, the switch operating mechanism is carried out with it and is conveniently exposed for replacement, adjustment, or repair. Furthermore, not only does the switch operating mechanism include a part, to-wit, shaft 14, extending to the outside of the housing 17, where it is provided with a part, knob 20, acessible to the operator for adjustment of the mechanism to the desired load value, but the arrangement also does away with any support for the switch operating mechanism extending to the stationary frame 1, which might obstruct or hide a portion of the scale graduations and thereby make them useless.

What I claim is:

1. In combination, a scale having a housing provided with a dial having a pointer movable thereover, a cover for said dial and pointer movably connected to said housing, an adjustable arm supported by said cover and movable along a path substantially parallel to the path of said pointer, an actuator for said arm extending to a point outside of said cover, a switch carried by said cover, and operating means for said switch including a part held by said arm in operative relationship with a portion of said pointer in passing, whereby said pointer will operate said switch when said pointer portion moves past said part on said arm.

2. In combination, a scale having a housing provided with a dial having a pointer movable thereover, a cover for said dial and pointer movably connected to said housing, an adjustable arm movable along a path substantially parallel to the path of said pointer, an actuator for said arm extending to a point outside of said cover, a mercury switch movably mounted on said cover to maintain a fixed position relative to the vertical independent of the position of said arm, and operating means for tilting said mercury switch including a part movable with said adjustable arm and a part movable with said pointer into operative relationship with said arm part.

3. In combination, a scale having a housing provided with a dial having a pointer movable thereover, a cover for said dial and pointer movably connected to said housing, an adjustable arm movable along a path substantially parallel to the path of said pointer, an actuator for said arm extending to a point outside of said cover, a switch carried by said cover, and operating means for said switch including a part held by said arm in position for engagement by a portion of said pointer in passing, said switch and operating means including means responsive to movement of said part by said pointer for moving said part out of the path of movement of said pointer, whereby the switch is operated without affecting the accuracy of said pointer.

4. In the combination of a circular scale dial having a pointer mounted axially thereof and movable thereover, an adjustable arm mounted coaxially with said pointer and movable along a circular path substantially parallel to the path of said pointer, a bracket rotatably mounted on said arm axis, a mercury switch on said bracket and balanced to remain always in the same position relative to the vertical, and operating means for said switch including a part held by said arm in position for engagement by a portion of said pointer in passing.

5. In the combination of a circular scale dial having a pointer mounted axially thereof and movable thereover, an adjustable arm mounted coaxially with said pointer and movable along a circular path substantially parallel to the path of said pointer, a bracket rotatably mounted on said arm axis, a mercury switch on said bracket and balanced to remain always in the same position relative to the vertical, and operating means for said switch including a part held by said arm in position for engagement by a portion of said pointer in passing and coacting parts one of which is associated with said switch, said coacting parts operatively engaging each other in all positions of said arm.

6. In the combination of a circular scale dial having a pointer mounted axially thereof and movable thereover, an adjustable arm mounted coaxially with said pointer and movable along a circular path substantially parallel to the path of said pointer, a bracket rotatably mounted on said arm axis, a mercury switch on said bracket and balanced to remain always in the same position relative to the vertical, said switch being mounted for tilting in a plane parallel to said arm axis, operating means for tilting said switch including a Y-crank on said arm engageable by a portion of said pointer in passing, said operating means also including a plunger coaxial with said arm and operatively connected with said crank, a disk on said plunger at right angles to said arm axis, and a yoke connected with said switch and embracing said disk.

EUGENE W. SCHELLENTRAGER.